(12) United States Patent
Ahadian et al.

(10) Patent No.: US 8,739,116 B2
(45) Date of Patent: May 27, 2014

(54) DEVELOPMENT ENVIRONMENT CONFIGURED TO GENERATE APPLICATION SOURCE CODE FROM DATABASE OBJECTS

(75) Inventors: Azadeh Ahadian, San Jose, CA (US); Todd R. Bender, San Jose, CA (US); Stephen A. Brodsky, Los Gatos, CA (US); Clifford D. Chu, San Francisco, CA (US); Zeus O. Courtois, Laredo, TX (US); Rebecca B. Nin, Morgan Hill, CA (US); Michael L. Pauser, Morgan Hill, CA (US); Brian G. Payton, San Jose, CA (US); Sonali Surange, San Rafael, CA (US); Hongdi Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/405,078

(22) Filed: Feb. 24, 2012

(65) Prior Publication Data

US 2012/0159432 A1  Jun. 21, 2012

Related U.S. Application Data

(63) Continuation of application No. 12/537,121, filed on Aug. 6, 2009, now abandoned, which is a continuation of application No. 12/464,712, filed on May 12, 2009, now abandoned.

(51) Int. Cl.
*G06F 9/44* (2006.01)

(52) U.S. Cl.
USPC ........... 717/106; 717/108; 717/109; 717/110; 717/113

(58) Field of Classification Search
None
See application file for complete search history.

(56) References Cited

U.S. PATENT DOCUMENTS

| | | | |
|---|---|---|---|
| 6,631,497 B1 | 10/2003 | Jamshidi et al. | |
| 6,810,429 B1 | 10/2004 | Walsh et al. | |
| 7,080,361 B2 | 7/2006 | Aigen | |
| 2004/0019589 A1 | 1/2004 | Basrur | |
| 2004/0044687 A1 | 3/2004 | Vachuska et al. | |
| 2004/0230555 A1 | 11/2004 | Phenix et al. | |
| 2004/0267690 A1* | 12/2004 | Bhogal et al. | 707/1 |
| 2006/0095276 A1 | 5/2006 | Axelrod et al. | |
| 2008/0005685 A1 | 1/2008 | Drews et al. | |
| 2008/0189679 A1 | 8/2008 | Rodriguez et al. | |
| 2010/0293523 A1 | 11/2010 | Ahadian et al. | |
| 2010/0293524 A1 | 11/2010 | Ahadian et al. | |

OTHER PUBLICATIONS

Huiwei Guan et al., Java-Based Approaches for Accessing Databases on the Internet and a JDBC-ODBC Implementation, Computing and Control Engineering Journal, Apr. 1998, pp. 71-78, vol. 9, Issue 2, Publisher: Institution of Electrical Engineers, Stevenage, UK.

(Continued)

*Primary Examiner* — Qamrun Nahar
(74) *Attorney, Agent, or Firm* — Patterson & Sheridan, LLP (57) ABSTRACT

Development tools are disclosed that connect various artifacts in a database aware fashion. For example, the development environment may integrate SQL query builders across multiple application development interfaces (e.g., a source code editor, XML editor, database scripting tools, etc.), significantly improving developer productivity, reducing development cost and time. Thus, the process of consuming heterogeneous artifacts in an application (or creating them for consumption) becomes a very productive experience, eliminating the need to manually cut/paste information in multiple project files in many cases.

20 Claims, 9 Drawing Sheets

(56) References Cited

OTHER PUBLICATIONS

Willy Farrel, IBM WebSphere Studio: The Next Generation of AD Tools, Application Developer 4.0, IBM Power Point Presentation, Apr. 16, 2002.

Carl Gould et al., JDBC Checker: A Static Analysis Tool for SQL/JDBC Applications, Proceedings of the 26th ternational Conference on Software Engineering (ICSE 2004), May 23-28, 2004, pp. 697-698, Publisher: IEEE Computer Society.

Ahadian et al., U.S. Appl. No. 13/405,066, filed Feb. 24, 2012.

* cited by examiner

DEVELOPMENT ENVIRONMENT CONFIGURED TO GENERATE APPLICATION SOURCE CODE FROM DATABASE OBJECTS

CROSS REFERENCE TO RELATED APPLICATIONS

This application is a continuation of co-pending U.S. patent application Ser. No. 12/537,121, filed Aug. 6, 2009, which is a continuation of co-pending U.S. patent application Ser. No. 12/464,712, filed May 12, 2009. Each of the aforementioned related applications is herein incorporated by reference in its entirety.

BACKGROUND OF THE INVENTION

1. Field of the Invention

Embodiments of the invention relate to tools used to develop application software. More specifically, embodiments of the invention provide an enhanced integrated development environment (IDE) for managing application source code, database systems, and related artifacts.

2. Description of the Related Art

Developing software applications is a complex task, and IDE tools are available to assist computer programmers with the development process. Currently, IDE tools are available to assist programmers developing applications in a variety of programming languages (e.g., Java® .net, C, C++, C#, etc.). These tools are typically configured with features such as auto-indenting, syntax highlighting, type checking, and a variety of other features that assist the development process. An IDE tool usually includes a text editor that visually displays errors as source code is typed, allowing a developer to correct errors before proceeding with the next line to code. Typically, IDE tools are optimized for different programming languages and errors are identified based on the programming language being used by the developer, often determined a suffix of a project file (e.g., .cpp for a c++ program or .java for a Java® program).

However, application programs have long since ceased to be developed as a single application built from a group of source code files. Instead, multiple applications interact with one another to provide users with a particular service. Frequently, for example, developers compose applications that interact with a database engine. The database may be developed with the application, but applications are also developed to interact with (often complex) existing database systems.

Typically, such an application may be configured with (or be configured to generate) a number of database queries (e.g., SQL statements) as well as the code needed to connect to the database, submit a query and receive results. Further, many object-to-relational frameworks exist for moving data between a database and an application program. Similarly, an application server may interact with a database and a web server to provide a web-based application. Part of the application code may create persistence for user data using database queries stored in XML files. More generally, database applications such as these typically have to create/consume numerous artifacts based on the business needs, inter-component interactions and best practices. Commonly used artifacts in a database application are SQL statements in Java code, stored procedures (which internally could be written in SQL/Java or another language), xml files, SQL files from database projects, etc.

To build these applications, developers typically interact with development tools customized for each distinct type of artifact. For example, as noted above, IDE tools may be used to compose source code in a variety of programming languages. Similarly, database tools may be used to create database models and compose queries using visual tools, etc. Each of these artifacts may have development tools within their own area/view/perspective/module within an IDE. That is, Java developers use a Java perspective of an IDE tool to build Java applications, database administrators use a data perspective of the IDE tool to build and improve SQL scripts or procedures. However, while many of the results of a development effort overlap significantly and interact with one another, the development tools themselves do not include mechanisms for connecting different aspects of the development process with one another.

SUMMARY OF THE INVENTION

One embodiment of the invention includes a method for an integrated development environment (IDE) tool to manage database aware application development. The method generally includes executing the IDE tool on a computing system having at least a processor, a memory, and a storage device. The IDE tool is configured to perform an operation which includes presenting within an interface of the IDE tool, a display of the database data model, receiving a selection of a database object of the database data model, and generating application source code configured to access the selected database object. The operation also includes storing an indication of the relationship between the database object and the application source code.

Another embodiment of the invention includes a computer-readable storage medium containing an IDE tool, which when executed on a processor, performs an operation to manage database aware application development. The operation may generally include presenting within an interface of the IDE tool, a display of the database data model, receiving a selection of a database object of the database data model, and generating application source code configured to access the selected database object. The operation also includes storing an indication of the relationship between the database object and the application source code.

Still another embodiment of the invention includes a system having a processor and a memory containing an IDE tool, which when executed on a processor, performs an operation to manage database aware application development. The operation may generally include presenting within an interface of the IDE tool, a display of the database data model, receiving a selection of a database object of the database data model, and generating application source code configured to access the selected database object. The operation also includes storing an indication of the relationship between the database object and the application source code.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

As noted above, software applications include many heterogeneous artifacts—each of which may be created by different individuals having different skill sets. And developers often share such artifacts with one another in an iterative process as application development evolves. Doing so frequently requires artifacts to be moved between different project files manually. For example, the text of an SQL statement composed by a database administrator (having expertise in a particular database) has to be manually cut/paste from SQL scripts into application source code (being composed by a developer). More simply, at least from a developer's perspective, IDE tools having a common underlying understanding of the components needed to build a database application are missing.

Embodiments of the invention introduce development tools that connect these various artifacts in a database aware fashion. For example, embodiments of the invention integrate SQL query builders across multiple application development interfaces (e.g., a source code editor, XML editor, database scripting tools, etc.) significantly improving developer productivity, reducing development cost and time. Thus, the process of consuming heterogeneous artifacts in an application (or creating them for consumption) becomes a very productive experience, eliminating the need to manually cut/paste information in multiple project files. Further, connecting the various development tools empowers novice users to perform complex tasks. For example, a visual SQL builder may allow a novice developer to easily build database objects representing a complex query and incorporate SQL statements generated from the database object into application source code. Further, once incorporated into the source code, the IDE tool may monitor the database object in the query development tool. Subsequent changes to the query in the visual SQL builder result in updates to the text of a query statement in application source code. Thus, rather than require the developer to manually cut and paste the query from the development tool to the source code file each time it is changed during the development process, the IDE tool manages the relationship between these items for the developer within a given development project. Therefore, the IDE tool greatly simplifies both the development and maintenance of an application, particularly in cases where a complex, finely tuned query resides in multiple locations within a development project.

Relationships between a variety of development artifacts and the development tool may be managed in a similar manner. For example, application source code and/or database statements may be used to generate and maintain database queries within stored procedures, database packages, XML files, and a variety of other application development artifacts.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
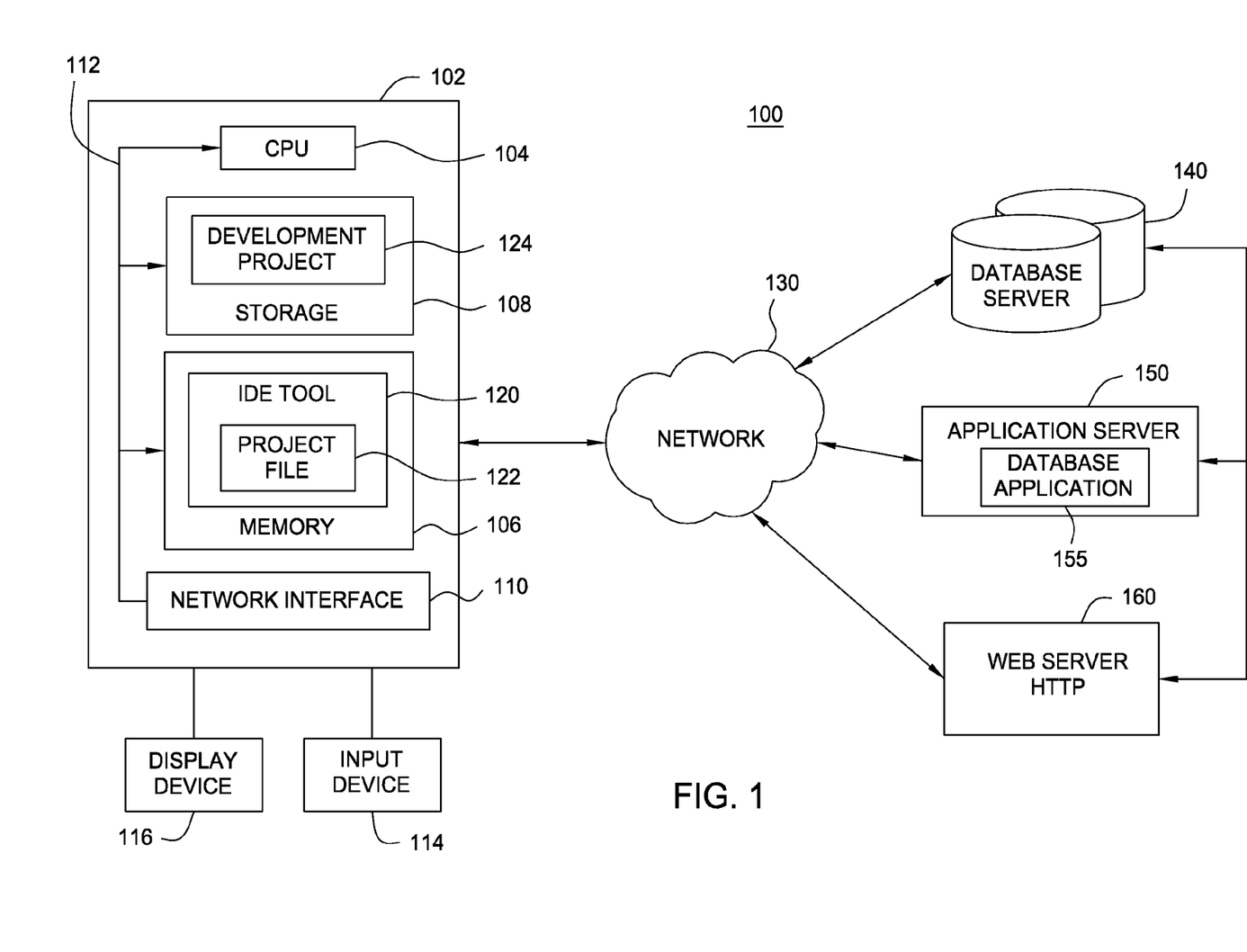
FIG. 1 illustrates an example computing system running an integrated development environment (IDE) tool, according to one embodiment of the invention.

FIG. 1 illustrates an example computing system 100 running an integrated development environment (IDE) tool, according to one embodiment of the invention. As shown, the computing system 100 includes a computer 102. The computer 102 is connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. The memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text-to-speech converter may be used.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

As shown, the memory 106 of the computer 102 includes an IDE tool 120 being used to access a project file 122. The project file 122 is included to be representative of a variety of different development artifacts, e.g., application source code files, library header files, XML files, database scripts, DDL files, SQL statements, markup language documents, JSP files, etc. Further, the project file 122 represents one file of a larger development project 124. More generally, project "project file" refers to any file used to develop computer software, frequently grouped together into logical projects for convenience. Of course, the development project itself is not mandatory and a "project file" may exist without an association to a specific development project (e.g., a file containing Java source code configured to connect and submit queries to a database system). As described in greater detail below, in one embodiment, the IDE tool 122 may provide plurality of editing tools, each configured to share and manage database aware information across multiple files within the development project 124.

FIG. 1 also shows database servers 140, application server 150, and web servers 160. Additionally, the application server 150 includes a database application 155. The database application 155 is included to be representative of a complete, deployed application composed using the IDE tool 120. For example, database application 155 may be hosted by the application server 150 and configured to access databases in the database server 140. In such a scenario, users may access the database application 155 through a web-based interface, where web pages requested through the web server 160 are generated by the application server 150 (e.g., by issuing data requests to database servers 140 and encapsulating query results in HTML markup). Of course, this scenario represents just one possible scenario for an application generated from development project 124 developed using IDE tool 106.

Figure 2:
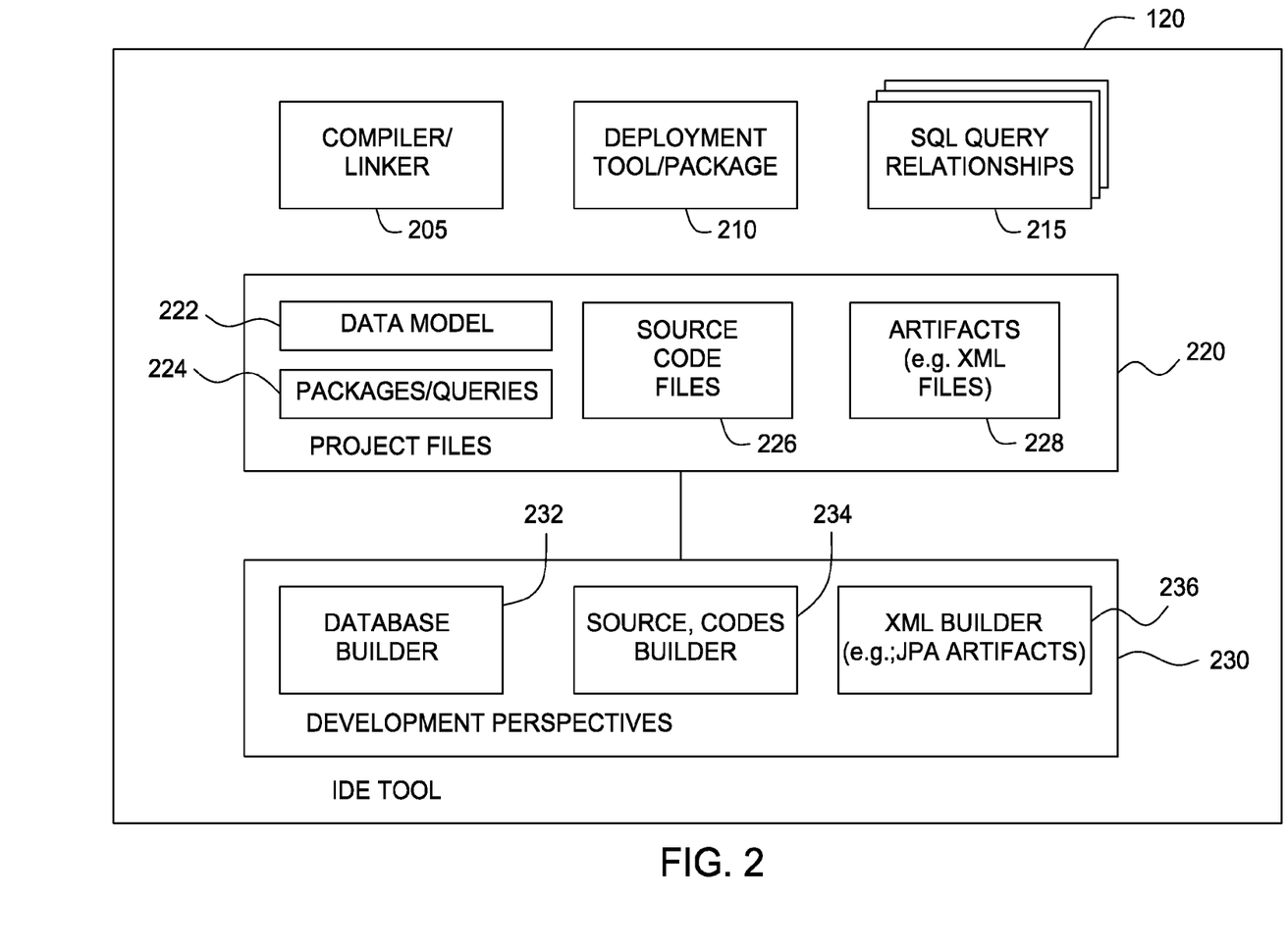
FIG. 2 illustrates an example of components from an IDE tool, according to one embodiment of the invention.

FIG. 2 illustrates components of the IDE tool 120 first shown in FIG. 1, according to one embodiment of the invention. As shown, the IDE tool 120 includes multiple development perspectives 230. Further, the IDE tool 120 includes a compiler/linker 205, a deployment tool/package builder 210, and SQL query relationships 215. And the project files 220 include a database data model 222, database packages/queries 224, source code files 226, and artifacts 228. As is known, the compiler/linker 205 may provide a software application configured to generate object code from the project files included in a given development project. Similarly the deployment tool/packager 210 may be used to create an installation package or deploy a given package to an application server. Additionally, the deployment tool/packager 210 may be configured to create a database package (i.e., a collection of pre-prepared queries which may be invoked by a database engine) or stored procedure on a database system.

In one embodiment, the development perspectives 230 provide a plurality of different editing tools each used to develop a database aware software application. Illustratively, the development perspectives 230 include a database query builder 232, a source code builder 234, and an XML builder 236. Of course, the IDE tool 120 may include additional development perspectives 230 tailored to allow developers to build other development artifacts associated with a database aware application. The project files 220 may be accessed by the various development perspectives 230, allowing each distinct type of project file to be edited using a tool tailored for a given type of project file. Further, the development perspectives 230 may be configured to interact with one another—allowing changes to a given project file to be propagated to others. For example, SQL query relationships 315 may be used to identify where a database query (composed using the database builder 232) is used in other project files 220 (e.g., in one of the source code files 226). Illustratively, the project flies include a database data model 222, a set of packages or SQL queries 224, source code files 226, and other artifacts 228 (e.g., XML files). Of course, like the development perspectives 230, the project files supported by the IDE tool 120 may include a variety of other project file types.

The database query builder 232 may provide a visual tool used to compose a database query. In one embodiment, the database query builder 232 provides a graphical user interface configured to allow developers to build complex SQL statements. For example, database query builder 232 may present developers with a design canvas which allows large SQL statements to be built in fragments, such as from clauses, predicates and so forth. Such an interface may allow query relationships resulting in joins between numerous tables to be represented by connecting lines between tables on a design canvas. Further, as the design is being edited, the resulting SQL may be presented to a user. Once completed, a user may provide a name for the query, and the IDE 120 may store the query within one of the project files 210.

Similarly, the source code builder 234 may provide a text-editing tool used to edit source code within a source code file 226. The source code builder 224 may be configured to provide a variety of features such as auto-indenting, syntax highlighting, type checking, and a variety of other features that assist the development process. In one embodiment, the source code may include the appropriate routines needed to connect to and submit a query (e.g., an SQL query) to a database configured according to a particular data model 212. The XML builder 236 may provide a tool used to compose XML grammars, or build XML documents consistent with a particular grammar. For example, the XML document may provide a document used to markup multiple SQL queries. Further, as noted, the queries in such a document may be edited using the database builder 232 and the IDE tool 120 may be configured to maintain the relationship between the query within one of the artifacts 228 (e.g., an XML file) and a particular database query 234 composed using the database query builder 232.

Figure 3:
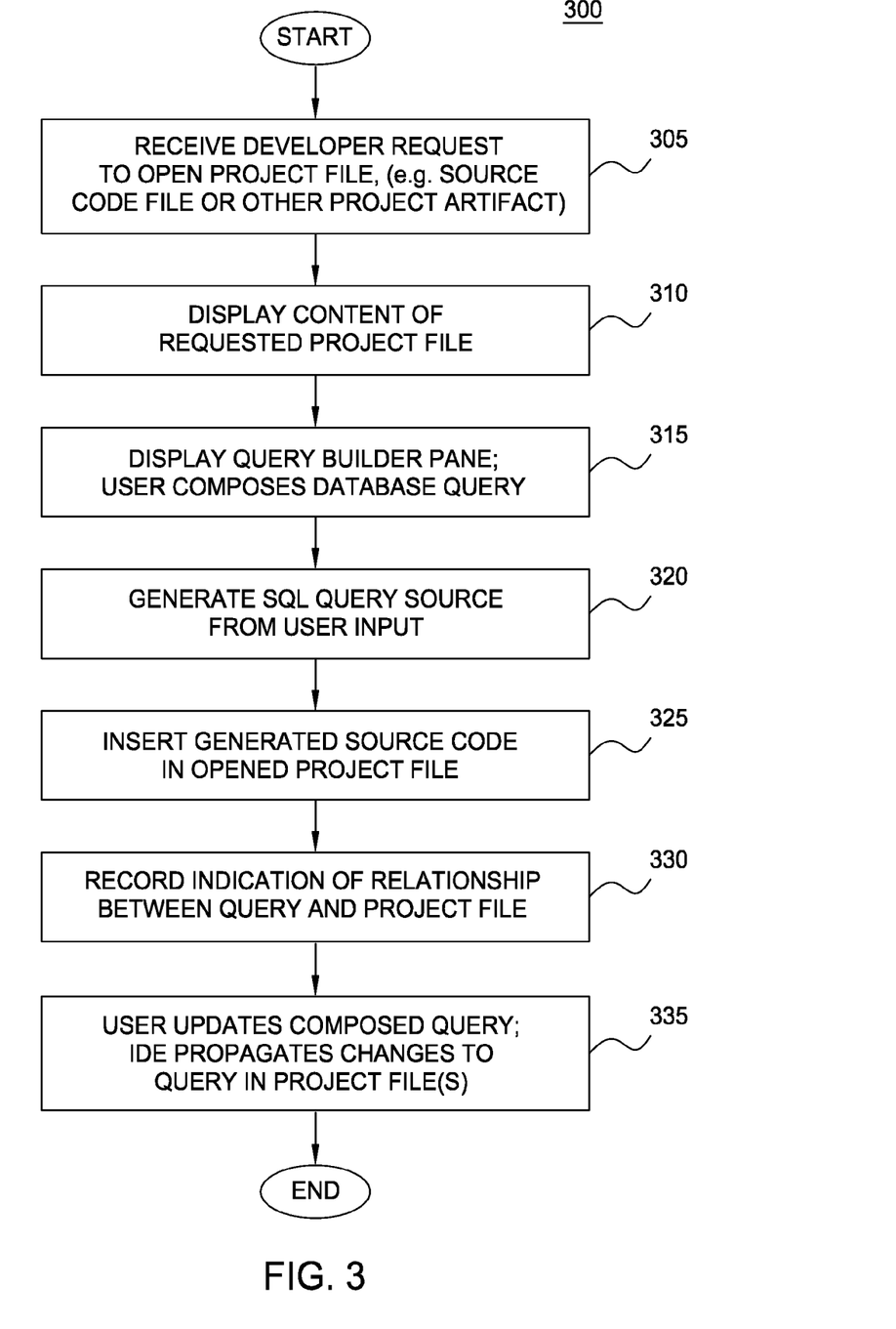
FIG. 3 illustrates a method for interactively editing an SQL query, according to one embodiment of the invention.
Figure 4:
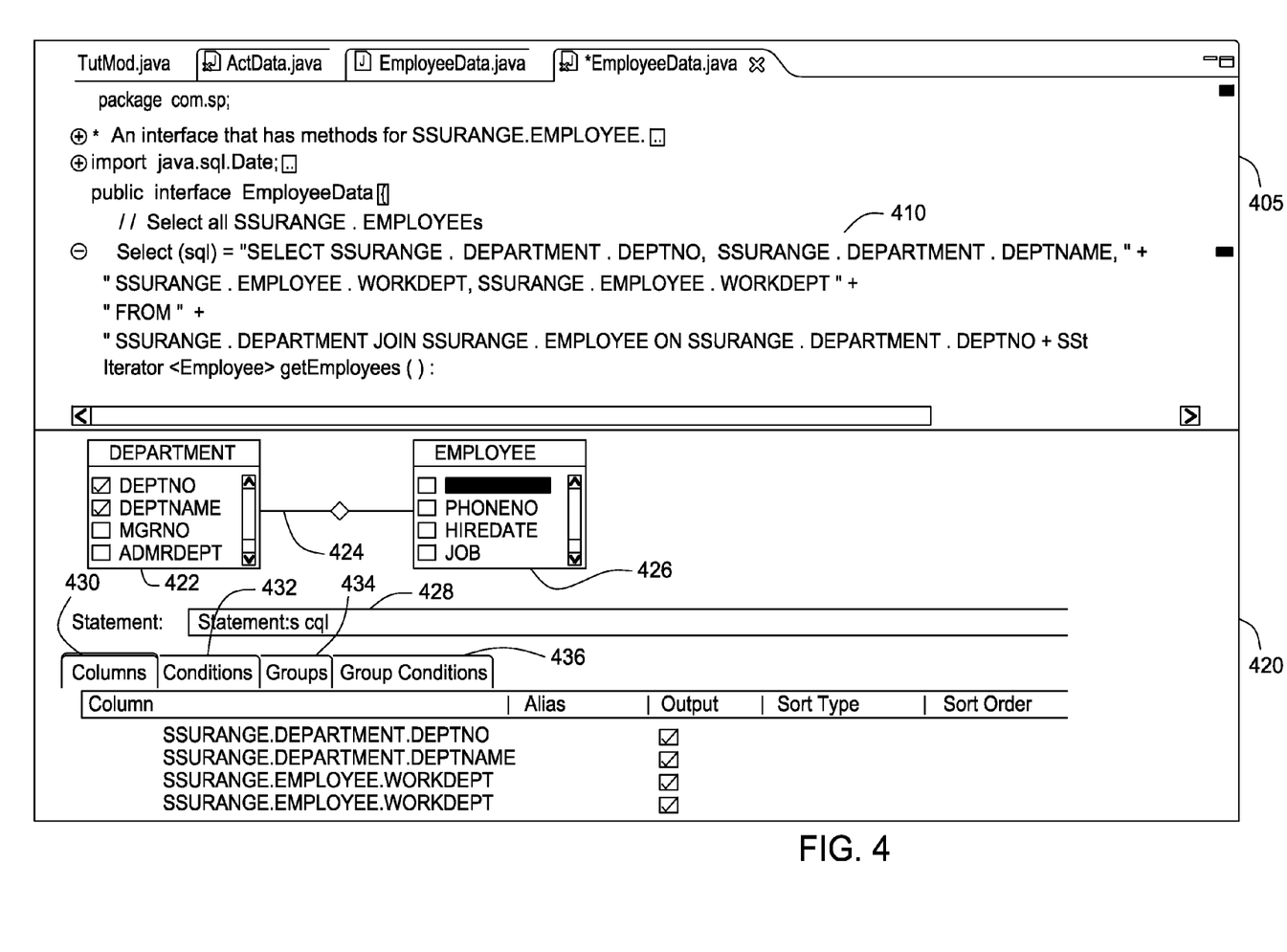
FIG. 4 illustrates an example screen display from of an IDE tool, according to one embodiment of the invention.

FIG. 3 illustrates a method 300 for interactively editing an SQL query, according to one embodiment of the invention. As shown, the method 300 begins at step 305 where the IDE tool 120 receives a request to open a given project file 220. For example, a developer may open a source code file that is to include software routines configured to access a database. At step 310, the IDE tool 120 may display the content of the requested project file. For example, FIG. 4 illustrates an example screen display 400 from the IDE tool 120, according to one embodiment of the invention. As shown, a source code pane 405 displays a fragment of source code for a routine "EmployeeData." This routine includes a statement 410 with an embedded SQL query (beginning with Select (sql)="SELECT. SSURANGE . . . ").

Returning to the method 300, at step 315, the IDE tool 120 may display a query builder pane, allowing the user to compose or modify a database query to be included in the project file. For example, the screen display 400 includes a design canvas 420 used to build a database query to include in the source code of the "EmployeeData" routine. In this case, the SQL statement 410 in the source code pane 405 is displayed in a visual form in the design canvas 420. As shown, a table 422 "Department" and a table 426 "Employee" are joined by a link 424. The link 424 represents a join relationship in the SQL query generated from the visual representation. As shown, the user has selected to include table 422 and table 426 in a query and specified what column to retrieve data from using checkboxes. Additionally, data from the columns are joined using a primary/key foreign key relationship between these two tables (represented using the link 424). Further, the design canvas 420 includes a pane 428 providing a database object name for this query "Statement1.sql." In this example, the pane 428 includes multiple tabs used to switch between editing different aspects of a database query. As shown, the columns tab 430 is selected—allowing the developer to specify what columns and tables to return data from that satisfies query conditions. The user may also switch to a conditions tab 432, a groups tab 434, and a group conditions tab 436, each used to access a visual interface, which allows a developer to edit different elements of a database query.

In addition to composing a database query using the design canvas shown in FIG. 4, the IDE tool 120 (and database query builder 232) may be adapted to provide developers with a variety of other functions related to database query development. For example, the developer may use the database query builder 232 to perform query tuning, associating performance measurement (both predictive and measured), query testing/test generation/test execution, querying/reporting and operating on the accumulated information, as well as provide integrated query formatting/annotating, and documentation generation.

Again returning to the method 300, at step 320, the IDE tool 120 generates an SQL query statement from the user input in the design canvas 420. And at step 325, the IDE tool 120 may insert the generated query source in the project file opened by the user at step 305, e.g., the IDE tool may insert statement 410 shown in pane 405 of FIG. 4. At step 330, the IDE tool may record an indication of the relationship between the database object (e.g., the "Statement1.sql" object shown in a visual format in design canvas 420) and the use of that database object within another project file 220 (e.g., the source code of the "EmployeeData" routine shown in pane 405. In one embodiment, at step 335, if the developer updates the composed query, e.g., adds additional columns from the "Department Name" table 422, the IDE tool 120 may update the text of the query statement 410 in the source code file, and in any other files which include the database query represented by the "Statement1.sql" database object. In other words, changes made in the design canvas 420 of the database query builder 232 are reflected in the Java code. This eliminates the need for manual copy/paste operations between source code and database development tools. Doing so provides application developers with a powerful, easy to use user interface. Thus, application developers, who may not have substantial SQL expertise, can still build complex SQL statements to include in source code files. Further, the IDE tool 120 manages the use of those statements throughout a software development project.

Note, although described relative to project file 220, which stores application source code, the IDE tool 120 may interact with a variety of different project artifacts that contain database query statements. For example documents in other source code languages, XML (or other markup languages) etc. may contain text representations of database queries. Further, although described relative to relational database statements (e.g., SQL) embodiments of the invention may be adapted for use with other database architectures (e.g., hierarchal databases such as the Information Management System (IMS) available from IBM).

Further, the IDE tool 120 may also be configured to assist developers working on the database side of data development project. Such developers may compose a variety of different development artifacts such as SQL script files, stored procedure definitions and other development files. For example, in one embodiment, the IDE tool 120 may create database access layers from SQL scripts or from within SQL editors containing such scripts. The code generation can also generate sample applications customized to match business needs, e.g. applications tailored to an existing database. This allows developers to quickly consume SQL resources within software applications being developed, significantly reducing many manual steps.

Figure 5:
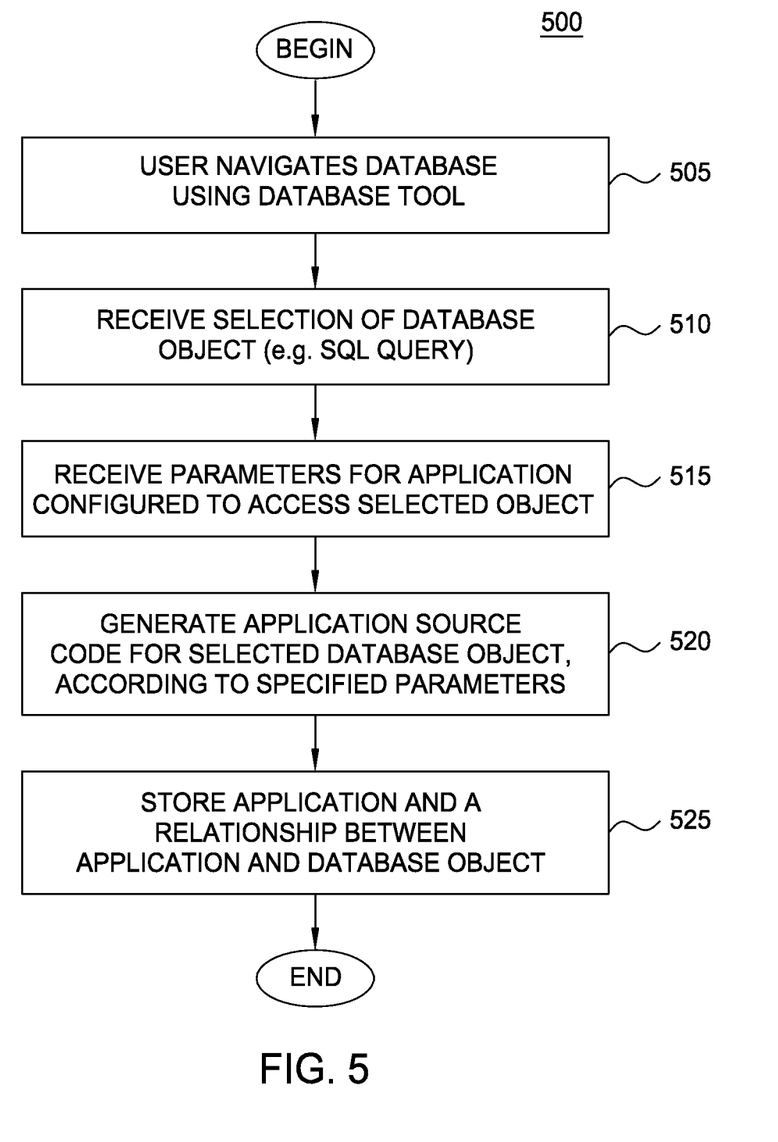
FIG. 5 illustrates a method for generating application code associated with a database object, such as a query, according to one embodiment of the invention.
Figure 6:
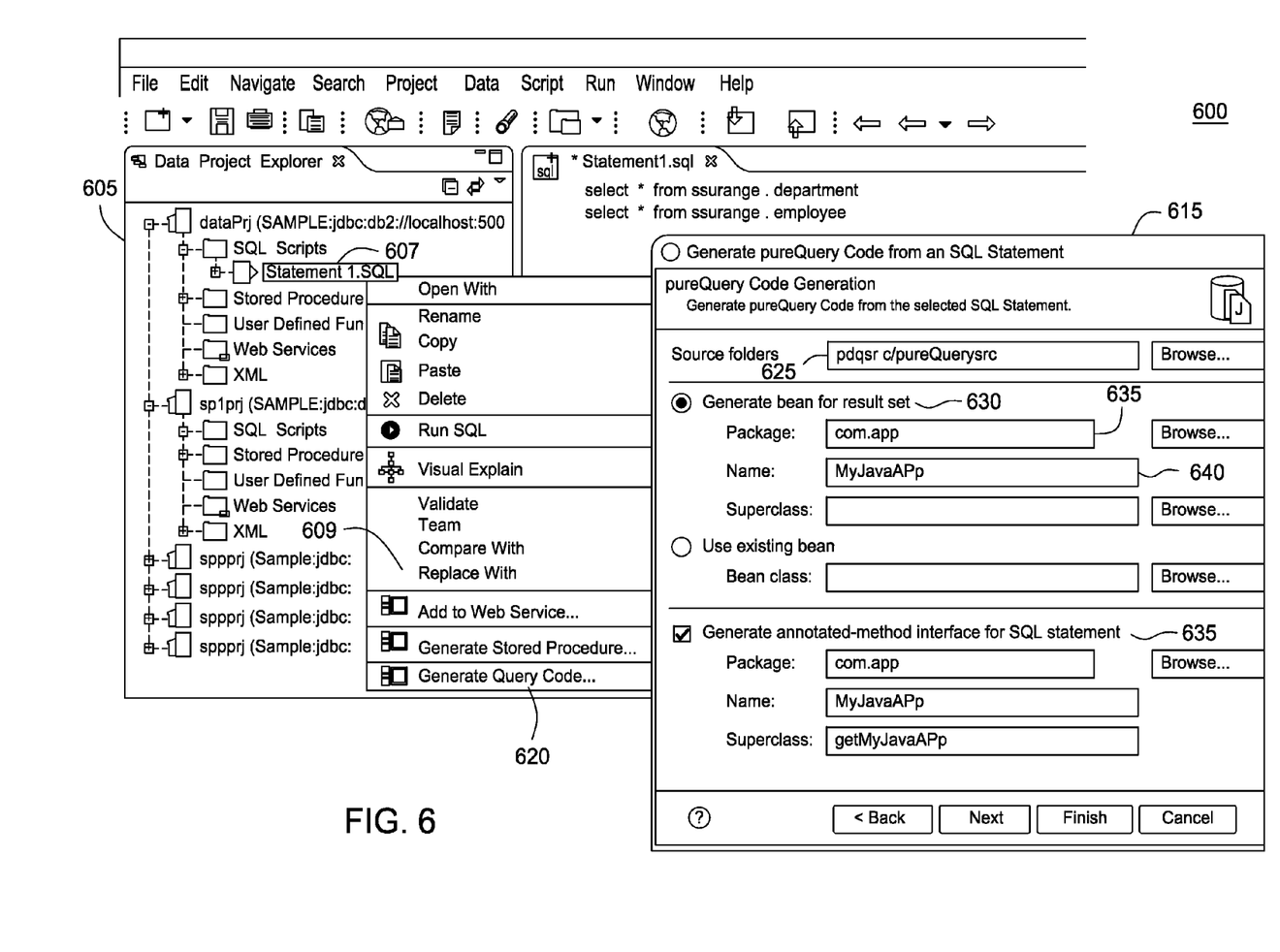
FIG. 6 illustrates an example screen display from of an IDE tool, according to one embodiment of the invention.

FIG. 5 illustrates a method 500 for generating application code associated with a database object, such as a SQL query statement, according to one embodiment of the invention. As shown, the method 500 begins at step 505 where a user navigates through a database data model using the IDE tool 120. And at step 510, the IDE tool 120 receives a selection of a database object, such as an SQL query script. FIG. 6 illustrates an example of this scenario in which a screen display 600 shows a user navigating through a data project explorer pane 605. Illustratively, the user has selected a database object 607 named "Statement 1.sql" and right-clicked a mouse, resulting in the display of a context menu 609. Among other options, the context menu 609 includes a menu item to generate a stored procedure and a menu item 620 to generate query code for the selected database object.

A dialog box 615 shows the results of selecting the "generate query code" menu item 620. Among others, the dialog box 615 allows the developer to specify a source folder 625 to store code generated around the database object. In this example, the developer has selected to generate a new bean object (a Java construct) using radio button 630. Note, the bean object is used to store a result set generated from the query represented by the "Statement1.sql" database object. Further, a checkbox 635 is used to indicate that the IDE tool should generate a method interface for the selected database object 607 (i.e., the "Statement1.sql" object).

Returning to the method 500, at step 515, the IDE tool receives parameters for an application configured to access the selected database object, such as the ones illustrated in FIG. 6. The parameters specify what code objects should be generated to access/create/update the database object. At step 520, the IDE tool 120 generates application source code for the selected database object, according to the specified parameters. For example, the developer may select the "Finish" button of the dialog box 615. In this scenario, the IDE tool 120 responds by generating a Java package named "com.app" (entered in a textbox 635) with an interface and method named as shown in FIG. 6. Further, the generated code includes a Java bean named "MyJavaApp" to include a result set in 640.

Thus, once a database query is composed, the IDE tool may be configured to generate a relational-to-object interface for this database query. Further, at step 525, the IDE tool 120 may store the application code generated at step 520 as well as an indication of the relationship between the database object (i.e., the "Statement1.sql" object) and the generated source code (stored in the "com.app" source file. Thereafter, should the developer modify the database statement underlying the generated source code, the IDE tool may be configured to update the source code (or simply notify the developer that the database code has changed).

Figure 7:
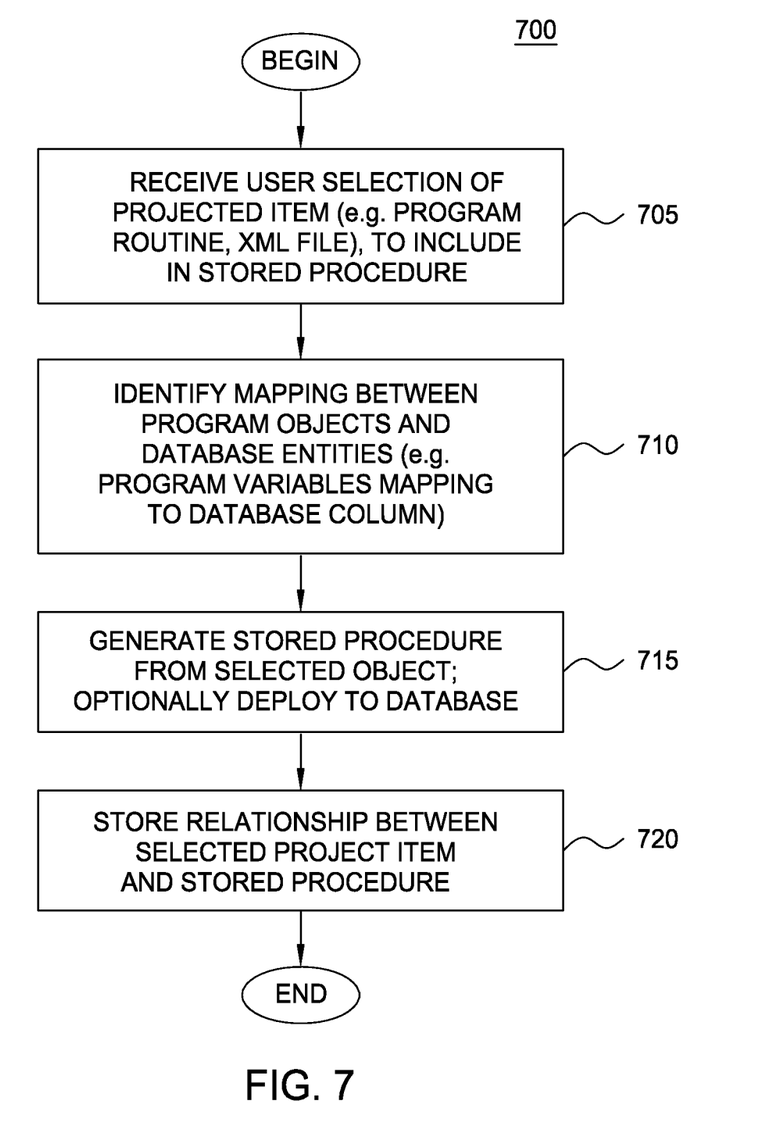
FIG. 7 illustrates a method for generating a stored procedure for a database system from information maintained in a in a project file in a development project, such as a source code file, according to one embodiment of the invention.

In one embodiment, the IDE tool 120 may be configured to generate stored procedures from the content of various project files 210. For example, a stored procedure may be generated from a Java method in the source code builder 234. A user interface may then be displayed to developer, which presents the proposed signature, input, output parameters, and types, etc. to provide a single click experience when creating stored procedures. Depending on business needs and practices followed by a development project, database routines such as stored procedures can be a significant part of database access. A stored procedure generally provides a subroutine available to applications accessing a relational database system. A stored procedure may be composed in many languages including SQL, Java, and other database or programming languages. FIG. 7 illustrates a method for generating a stored procedure for a database system from information maintained in a in a project file in a development project, such as a source code file, according to one embodiment of the invention.

Figure 8:
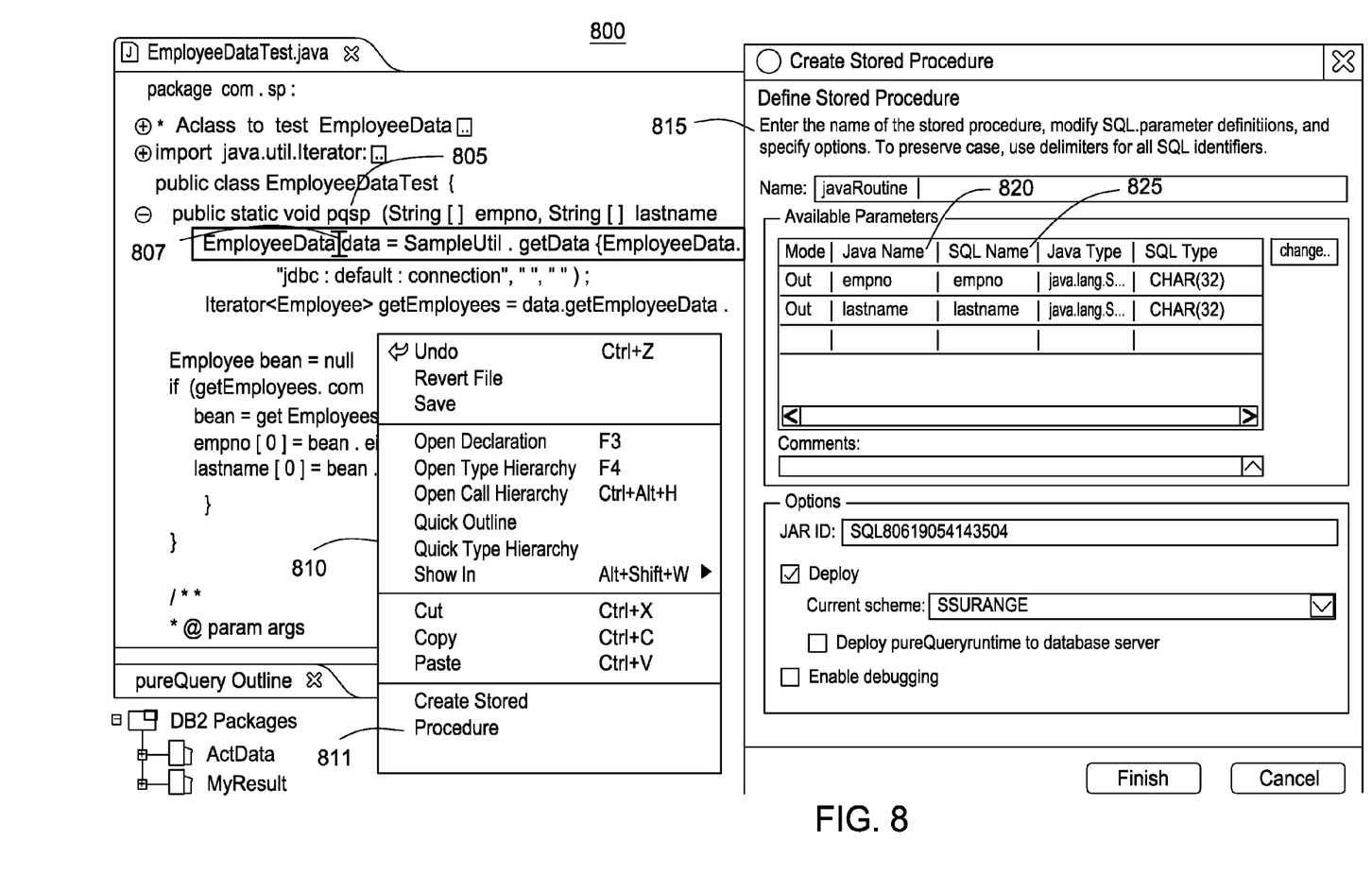
FIG. 8 illustrates an example screen display from of an IDE tool, according to one embodiment of the invention.

As shown, the method 700 begins at step 705 where the IDE tool 120 receives a user selection of a project item to include in a stored procure. And at step 710, the IDE tool 120 identifies a mapping between program objects and database entities. For example, the user may select a program routine such as a Java method (composed using the source code builder 234), a SQL query (composed using the database query builder 232), or other development project artifact. FIG. 8 illustrates an example using the source code builder 234. Specifically, FIG. 8 illustrates an example screen display 800 generated by the IDE tool 120, according to one embodiment of the invention. As shown, the source code builder 234 displays the source code for a Java method 805 named "pqsp." In this example, the developer has selected a line of source code (indicated by the highlighting and the position of a cursor 807) and right-clicked a mouse, resulting in the display of a context menu 810. Among other options, the context menu 810 includes a menu item 811 which the developer may select to generate a stored procedure from the selected program object (i.e., the Java method 805).

In one embodiment, in response, the IDE tool 120 may present the developer with dialog box 815. In this example, the user the dialog box 815 allows the developer to name a stored procedure to generate from the selected Java method 805 and presents the user with the mappings between the application source code (Java names 820) and the corresponding database object names (SQL names 825) identified by the IDE tool 120. That is, the dialog box 815 includes references to variable names in the source code, which map to objects in the database such as table/column names. Additionally, the developer may specify whether to deploy the stored procedure or save the stored procedure as one of the project files in the development project. At step 715 of method 700, once the developer completes specifying options in the dialog box 815, the "Finish" button may be used to generate and potentially deploy the stored procedure corresponding to the project file (e.g., the source code in Java method 805). And at step 720, the IDE tool 120 may store an indication of the relationship between the selected project item (e.g., the source code of the Java method 805) and the stored procedure generated from this project item. Thereafter, should the developer modify the database statement underlying the generated stored procedure, the IDE tool may be configured to update the source code (or simply notify the developer that the database code has changed).

The IDE tool may be configured to generate additional database objects from SQL statements stored inside project files (e.g., Java files or XML files). For example, a properties file used to bind SQL into database packages typically define properties on a per Java file basis. In one embodiment the IDE tool 120 ma maintains a connection between the java files containing the SQL and the options needed to perform the bind. Further, the IDE tool 120 may be configured to generate the database package from one or more SQL statements in program source code.

Figure 9:
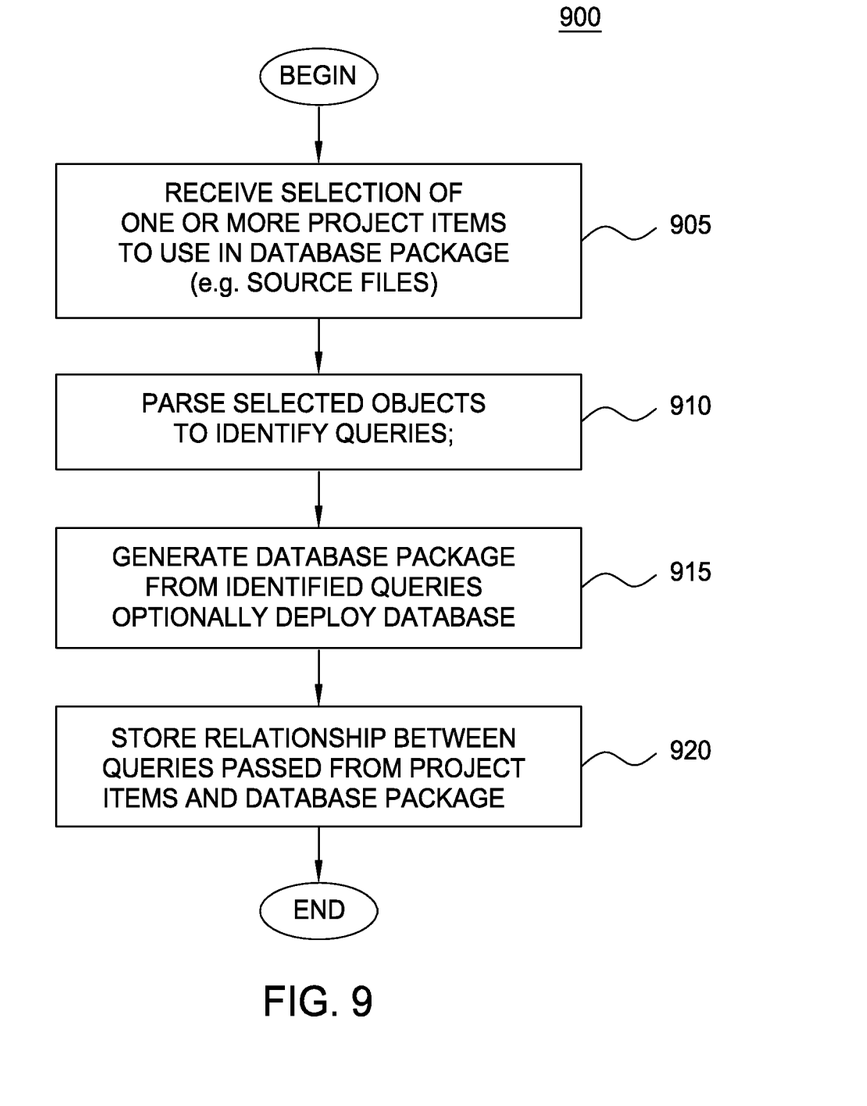
FIG. 9 illustrates a method for generating a database package from project files associated with a development project, according to one embodiment of the invention.

FIG. 9 illustrates a method 900 for generating a database package from project files associated with a development project, according to one embodiment of the invention. As shown, the method 900 begins at step 905, where the IDE tool 120 receives a selection of one or more project files to use in a database package. As noted, the project files may include program source code files. Similarly, the project files may also include XML files used to store a collection of SQL queries used by the Java Persistence API to allow a Java bean to interact with a database. In one embodiment, the developer may specify the properties file(s) to bind the SQL queries and build a database package from the queries in the project file. Accordingly, at step 910, the IDE tool 120 parses the selected project files to identify database queries in the file. At step 915, the IDE tool 120 may generate a database package that includes the identified queries. Optionally, the package may be deployed to a given database. As known, a database may generate an access plan for each query in the database package, improving database performance when such queries are invoked by an application.

At step 920, the IDE tool 120 may store an indication of the relationship between the selected project item and the database package generated from the project item identified at step 805. Thereafter, should the developer modify the database statement underlying the database package, the IDE tool 120 may be configured to update the database package (or simply notify the developer that the database code has changed).

Advantageously, as described herein, the IDE tool may be configured to assist developers working on a database aware software application. Such applications may include many distinct development artifacts, e.g., source code files, XML files, SQL scripts, archive files, etc. Embodiments of the invention provide development tools that connect various artifacts such as these in a database aware fashion. For example, embodiments of the invention integrate SQL query builders across multiple application development interfaces (e.g., a source code editor, XML editor, database scripting tools, etc.) significantly improving developer productivity, reducing development cost and time. Further, once incorporated into the source code, an IDE tool may monitor database objects generated using a query development. Subsequent changes to the query in the visual SQL builder result in updates to the text of a query statement in application source code. Thus, rather than require the developer to manually cut and paste the query from the development tool to the source code file each time it is changed during the development process, the IDE tool manages the relationship between these items for the developer within a given development project. Therefore, the IDE tool greatly simplifies both the development and maintenance of an application, particularly in cases where a complex, finely tuned query resides in multiple locations within a development project.

While the foregoing is directed to embodiments of the present invention, other and further embodiments of the invention may be devised without departing from the basic scope thereof, and the scope thereof is determined by the claims that follow.

What is claimed is:

1. A computer-implemented method for an integrated development environment (IDE) tool to manage database aware application development, the method comprising:
    executing the IDE tool on a computing system having at least a processor, a memory, and a storage device, wherein the IDE tool is configured to perform an operation, comprising:
        presenting within an interface of the IDE tool, a display of the database data model,
        receiving a selection of a database object of the database data model,
        generating application source code configured to access the selected database object,
        storing an indication of the relationship between the database object and the application source code;
        in response to determining that the database object has been modified, updating the application source code configured to access the selected database object to reflect the modification.

2. The method of claim 1, wherein the operation further comprises, prior to generating the application source code, receiving one or more parameters characterizing the application source code to be generated to access the database object.

3. The method of claim 1, wherein generating application source code comprises generating a stored procedure.

4. The method of claim 3, further comprising, deploying the stored procedure to a database engine.

5. The method of claim 1, wherein the operation further comprises:
    receiving a request to access the application source code;
    presenting the application source code on an editing pane of the IDE tool; and
    in response to determining that one or more modifications have been made to the application source code, updating the selected database object to conform to the modifications made to the application source code.

6. The method of claim 1, wherein the operation further comprises:
    receiving a request to access the selected database object;
    presenting the database object on a design canvas of the IDE tool; and
    in response to determining that one or more modifications have been made to the database object:
        regenerating the application source code to conform to the modifications made to the database object.

7. The method of claim 1, wherein the database object comprises a database query.

8. The method of claim 7, wherein generating the application source code comprises generating a relational-to-object interface for the database query.

9. A computer-readable storage medium containing an integrated development environment (IDE) tool, which when executed on a processor, performs an operation to manage database aware application development, the operation comprising:
    presenting within an interface of the IDE tool, a display of a database data model,
    receiving a selection of a database object of the database data model,
    generating application source code configured to access the selected database object,
    storing an indication of the relationship between the database object and the application source code; and
    in response to determining that the database object has been modified, updating the application source code configured to access the selected database object to reflect the modification.

10. The computer-readable storage medium of claim 9, further comprising, prior to generating the application source code, receiving one or more parameters characterizing the application source code to be generated to access the database object.

11. The computer-readable storage medium of claim 9, wherein generating application source code comprises generating a stored procedure.

12. The computer-readable storage medium of claim 11, wherein the operation further comprises, deploying the stored procedure to a database engine.

13. The computer-readable storage medium of claim 9, wherein the operation further comprises:
    receiving a request to access the application source code;
    presenting the application source code on an editing pane of the IDE tool; and
    in response to determining that one or more modifications have been made to the application source code, updating the selected database object to conform to the modifications made to the application source code.

14. The computer-readable storage medium of claim 9, wherein the operation further comprises:
- receiving a request to access the selected database object;
- presenting the database object on a design canvas of the IDE tool; and
- in response to determining that one or more modifications have been made to the database object:
  - regenerating the application source code to conform to the modifications made to the database object.

15. A system, comprising:
- a processor; and
- a memory containing an integrated development environment (IDE) tool, which when executed on a processor, performs an operation to manage database aware application development, the operation comprising
  - presenting within an interface of the IDE tool, a display of a database data model,
  - receiving a selection of a database object of the database data model,
  - generating application source code configured to access the selected database object,
  - storing an indication of the relationship between the database object and the application source code, and
  - in response to determining that the database object has been modified, updating the application source code configured to access the selected database object to reflect the modification.

16. The system of claim 15, further comprising, prior to generating the application source code, receiving one or more parameters characterizing the application source code to be generated to access the database object.

17. The system of claim 15, wherein generating application source code comprises generating a stored procedure.

18. The system of claim 17, wherein the operation further comprises, deploying the stored procedure to a database engine.

19. The system of claim 15, wherein the operation further comprises:
- receiving a request to access the application source code;
- presenting the application source code on an editing pane of the IDE tool; and
- in response to determining that one or more modifications have been made to the application source code, updating the selected database object to conform to the modifications made to the application source code.

20. The system of claim 15, wherein the operation further comprises:
- receiving a request to access the selected database object;
- presenting the database object on a design canvas of the IDE tool; and
- in response to determining that one or more modifications have been made to the database object:

regenerating the application source code to conform to the modifications made to the database object.

* * * * *